Figure 1:
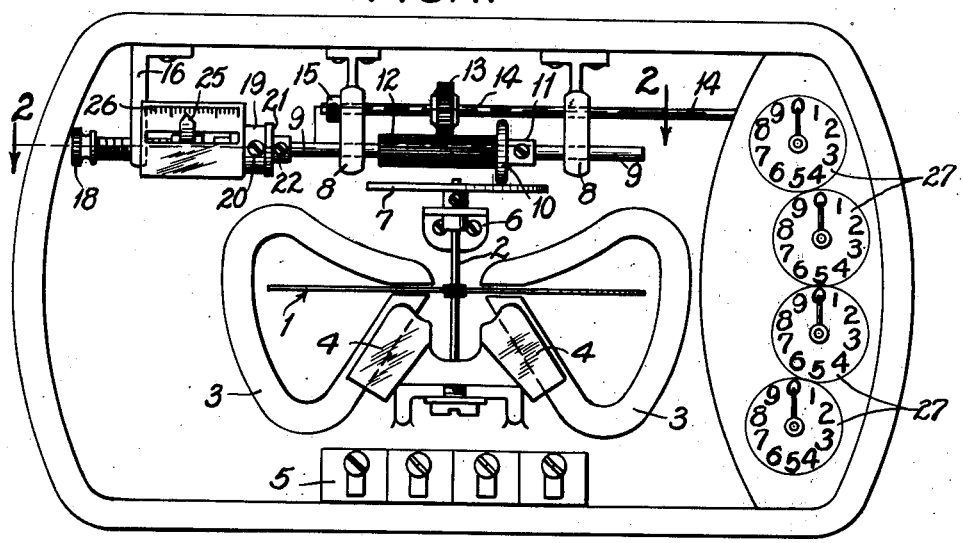

Feb. 19, 1935. W. K. HOLLAND 1,991,612
REGISTERING DEVICE
Filed Feb. 6, 1933

INVENTOR;
WILLIAM K. HOLLAND
BY
ATTORNEY

Patented Feb. 19, 1935

1,991,612

UNITED STATES PATENT OFFICE 1,991,612

REGISTERING DEVICE

William K. Holland, Chicago, Ill.

Application February 6, 1933, Serial No. 655,312

5 Claims. (Cl. 171—273)

My invention relates to metering devices used for the measurement of such agents as electricity, water or gas, in which there is provided a movable element actuated by the flow of the agent and means for recording the movement thereof on the registering portion of the device. My invention is particularly applicable to watthour meters used for the measurement of electrical energy.

In the production of electrical energy used for industrial and domestic purposes there are two elements which vitally affect the price which must be charged for the energy. One of these elements is the rate at which the energy might be consumed, sometimes referred to as the demand, and the second element is the quantity of energy consumed over a given period. The unit of measurement for the first element is the kilowatt and for the second element the kilowatt hour.

The rate at which energy is consumed affects the capacity in generating equipment which the supplier of the energy must have available, since the aggregate demands of all consumers at any one time determines the capacity of the equipment which must be provided to supply this demand. The costs which enter into this element of service are such costs as interest on investment, depreciation, taxes and other costs commonly known as fixed charges, which are independent of the operating costs as reflected in operating labor, coal and other supplies incident to the generation of power.

In the case of consumers of large quantities of power it has been common practice to recognize the influence of these two elements of cost by providing a rate which is made up first, of a demand charge based on the fixed charges referred to above and the maximum rate at which power is consumed, and second, an energy charge which reflects the operating cost of actually generating the power. Where large quantities of power are involved separate meters are often used, one to register demand measured in kilowatts and another to register consumption measured in kilowatt hours, and accounts are rendered showing the charges for these two separate elements. As such metering equipment is costly to install and expensive to maintain it is not suitable for use where the amount of power involved is relatively small, for example, in domestic service. Since, however, a large proportion of the power output of the supplier consists of the aggregate of small individual quantities used in domestic and minor industrial service, the elements of demand charge and energy charge are just as important in the case of the small consumer as in the case of the large consumer, and various expedients have been adopted by power companies in an attempt to make the small consumer's bill reflect these two elements of cost.

Because of the great number of small consumers and the relatively small amount of power consumed individually by such consumers, any metering device used must be inexpensive in first cost and of such construction as to require little maintenance. Heretofore, it has been impossible to manufacture a meter having these characteristics which would reflect in its registration not only the amount of energy consumed over a given period as measured in kilowatt hours, but also the demand, or rate at which such energy might be consumed. Consequently, it has been common practice on the part of the suppliers of power to install watthour meters for service supplied to small consumers, and to attempt to give effect to the demand, or rate at which power might be taken by setting up price schedules in which the charge per kilowatt hour varied with the quantity of energy consumed. For example, the schedules of some companies provide that the unit price of energy will vary with the quantity consumed, and under a schedule of this type the charge per kilowatt hour decreases step by step as the quantity consumed in the billing period increases. This arrangement, however, permits the larger consumer to reach the lower schedules more quickly than the smaller consumer, and thus gives him a preferential average rate not enjoyed by the smaller user. Some companies attempt to correct this objection by providing that the larger potential consumer must use more kilowatt hours at the higher rate than the smaller consumer, and in actual practice in domestic service this is sometimes effected by requiring a certain consumption of kilowatt hours per dwelling room before the second and successively lower steps in the schedule are reached. Such methods of computing charges are only rough approximations at best and furthermore result in complicated price schedules which confuse the consumer and lead to misunderstandings and friction, and furthermore, result in complicated and costly accounting procedure.

The principal object of my invention is to provide a metering device which will reflect in its registration not only in the actual quantity of the agent passing through the meter in a given period, but also the rate at which that agent might be consumed. A metering device possessing these characteristics permits of the simplication of rate schedules, with attendant reduction in accounting cost, as explained below.

While the application of my invention is not restricted to watthour meters used for the measurement of electrical energy, its particular adaptation to this use is shown in the drawing and described herein.

The embodiment of my invention as applied to a single phase watthour meter is shown in the drawing and described in the specification. In the conventional type of watthour meter as used heretofore the flow of energy operates a disc connected to a shaft, which shaft, in turn, is connected to a train of gears operating the registering dials. My invention provides for the insertion of an adjustable speed changing mechanism between the disc and the train of gears so that various speeds of the latter may be obtained for a given speed of rotation of the disc by adjustment of the speed changing mechanism.

Figure 2:
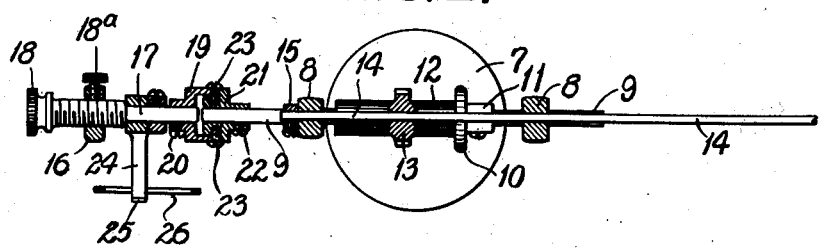

Referring to the drawing, in which one embodiment of my invention is shown and in which similar numerals are used to designate similar parts, Fig. 1 represents a front view of a single phase watthour meter with the case removed and with the device of my invention applied thereto; Fig. 2 represents a sectional view along the line 2—2 of Fig. 1.

The primary disc of the meter is represented by the numeral 1, this disc being rotated by the magnetic field set up by coils through which the current passes, these coils being located in the back portion of the meter, but not shown in the drawing. The rotation of this disc is proportionate to the actual number of kilowatt hours passing through the meter. The disc 1 is attached to the shaft 2 which is supported by and rotates in a jeweled bearing located toward the bottom of the case. Permanent magnets 3 are used for adjustment of the meter, these magnets being supported by shoes 4 in such a manner as to permit change in position of the magnets and thereby correction of the registration of the meter. The terminal block of the meter 5 is provided with binding screws to which wires from the source may be connected and from which wires are run to the electro-magnetic coils in the back of the meter.

Near the upper end of the shaft 2 and suitably carried by the meter case is a steady bearing 6 provided for the purpose of holding the shaft 2 in permanent vertical alignment. Attached to the upper end of the shaft 2 and concentric therewith, is the disc 7, the plane of this disc being parallel to the plane of the disc 1 and normal to the center line of the shaft 2. Since discs 1 and 7 are both connected to the shaft 2, the disc 7 will make a complete revolution for each complete revolution of the disc 1.

Revolvable in suitable bearings carried by supports 8 attached to the case is the shaft 9, and fixed thereto is the disc 10. The axis of the shaft 9 is parallel to the plane of the disc 7, and since the general plane of the disc 10 is normal to the shaft 9, it is also normal to the disc 7. Furthermore, the axis of the shaft 9 intersects the vertical axial line of the shaft 2 extended. The shaft 9 is so positioned with respect to the disc 7 that the upper surface of the disc 7 and the peripheral surface or edge of the disc 10 are in operating contact with each other, so that rotation of the disc 7 will cause rotation of the disc 10. If desired, the upper surface of the disc 7 and the operating edge of the disc 10 may be provided with suitable covering material to prevent slippage therebetween. The disc 10 is held in a fixed position laterally on the shaft 9, for example, by a collar 11.

Fixed to the shaft 9 and concentric therewith is an elongated pinion gear 12 so arranged as to mesh with a gear 13 fixed to an auxiliary shaft 14, which shaft is rotatable in suitable bearings carried by supports 8. The number of teeth on the gears 12 and 13 may be any number found to be expedient in the design of the meter. The shaft 14 is fixed in position laterally, for example, by means of the collar 15, and one end of this shaft is connected to the train of gears operating the registering dials 27.

Carried by a support 16 attached to the meter case is an adjusting mechanism arranged as follows: A shaft 17, having its axial line coincident with the axial line of shaft 9 extended, is provided with a screw thread toward its outer end, these threads engaging with threads formed in the support 16. At the extreme end of the shaft 17 is a knurled head 18 by means of which the shaft may be turned and its position laterally changed. The set screw 18ª, when tightened, will hold the shaft securely in any desired position. The inner end of the shaft 18 is secured to the part 19 by means of the set screw 20, and the adjacent end of the shaft 9 is similarly secured to the part 21 by means of the set screw 22. Parts 19 and 21 may be given temporary connection with each other by means of the set screws 23, so that when the shaft 17 is turned by means of the knurled head 18, the shaft 9 and its attached gear 12 and disc 10 will be moved laterally with respect to the vertical axis of the shaft 2, and, therefore, with respect to the center of the disc 7.

Supported by the shaft 17 and fixed by any suitable means so as to move laterally but not rotatably therewith, is the arm 24, terminating in the pointer 25. Fixed to the support 16 is the scale 26, so arranged that as the shaft 17 is rotated and caused to move laterally, the pointer 25 will move along the scale 26 and indicate the relative position of the shaft 17, and therefore of the shaft 9 and, in turn, the disc 10, with respect to the center of the disc 7.

Having described the embodiment of my invention shown herewith its method of operation as explained below will be clear: Electric current flowing through the electro-magnetic coils of the meter will cause the disc 1 and the shaft 2 to rotate. The disc 7, being fixed to the shaft 2, will rotate at the same speed as the disc 1. The rotation of the disc 7 will be imparted normally to the disc 10, which will cause rotation of the gear 12, the gear 13, the shaft 14, and finally the train of gears actuating the metering dials.

It is evident that the speed of rotation of the disc 10 will depend upon its radial distance from the center of the disc 7. If, for example, the shaft 9 is moved so that the operating edge of the disc 10 is in vertical alignment with the shaft 2m, that is, at the center of the disc 7, there will be no rotation of the disc 10, and, therefore, no registration of the dials. If the radial distance from the center of the disc 7 to the operating edge of the disc 10 is equal to the radius of the disc 10, then for one revolution of the disc 7 there will be one revolution of the disc 10, and the registration on the dials will be the same with respect to the rotation of the disc 1 as in the usual standard meter, that is, the dials will register actual kilowatt hours consumed. It is clear, however, that if the shaft 9 is moved laterally to the left by manipulation of the shaft 17, as described above, and the radial distance from the center of the disc 7 to the operating edge of the disc 10 decreased, one revolution of the disc 1 will result in less than one revolution of the disc 10 and consequently a lower registration on the dials than in the standard meter. Conversely, if the shaft 9 is move laterally to the right, and the radial distance between the center of the disc 7 and the operating edge of the disc 10 increased, one revolution of the disc 1 will cause the disc 10 to rotate more than one revolution, and will result in a higher registration on the dials than in the case of a standard meter. If the radial distance from the center of the disc 7 to the operating edge of the disc 10 is twice the radius of the disc 10, the latter will make two complete revolutions for each revolution of the disc 1, and the registration on the dials will be twice as great as in the case of a standard meter.

It will be evident that for a given speed of rotation of the disc 1 my device permits large variety of speeds for the disc 10, and therefore a large variation in the possible registration on the metering dials.

The adaptation of this embodiment of my invention as applied to a watthour meter used in domestic service, or to a meter used in relatively small industrial service, is as follows: Depending upon the potential kilowatt demand of a given consumer, as determined, for example, by the rated capacity of the appliances connected to the circuit or the number of dwelling rooms, and the normal consumption of the energy as measured in kilowatt hours, a factor is derived, which when applied to actual kilowatt hours consumed, would reflect the effect of the potential demand in kilowatts. The meter would be adjusted by manipulation of the shaft 17 as described above so that the position of the pointer 25 on the scale 26 would properly reflect this factor, with the result that the registering dials would not register true kilowatt hours consumed but kilowatt hours at a demand of one kilowatt, that is, kilowatt hours at one kilowatt. For example, in the case of a dwelling having five rooms the meter might be set, as explained above, so that the registering dials would read actual kilowatt hours, whereas, in the case of a dwelling having seven rooms with a larger connected load and a higher potential demand, the meter might be set so that the registering dials would not read actual kilowatt hours but one and two tenths times the actual number of kilowatt hours. Thus the higher demand of the consumer with the larger potential load would be reflected in the registration of the meter, but his unit charge for energy as registered might be made identical with the unit charge of the smaller consumer.

It is evident that my invention provides a new and useful improvement in the method of measuring electrical energy in that it permits effect to be given in a single meter to the potential demands of various consumers, and that through the use of my invention it is possible to avoid the complicated rate schedules heretofore in effect and to minimize the difficulties of accounting necessarily incident to present rate schedules. It is further evident that changes in basic charges from time to time readily may be compensated for by adjustment of individual meters, and further, that a meter of uniform size and type can be used for various classes of customers, since it is only necessary to make the required adjustment in a particular case, after which the meter can be sealed so as to avoid its being tampered with.

While I have shown and described one embodiment of my invention it is evident that changes can be made without deviating from the principle thereof. My invention, for example, is applicable to polyphase meters as well as to single phase meters, and is also applicable to meters used for measuring agents other than electricity. Furthermore, well known mechanical equivalents may be substituted for the particular and specific means shown for achieving the results as described herein. I contemplate such other uses of my device and such mechanical changes in its construction as will not depart from the spirit of my invention, which in essence provides for the interposition of a speed changing mechanism between the driven element of a metering device and the registering portion thereof whereby, through adjustment of the speed changing mechanism, various registrations may be obtained for a given speed of the driven element.

What I claim as new and desire to secure by Letters Patent, is:—

1. In a meter having a movable element actuated by the flow of the quantity metered and a registering mechanism arranged to indicate the movement of such element, an adjustable speed changing device interposed between said element and said mechanism whereby for a given movement of said element varying registrations may be obtained on said mechanism.

2. In a watthour meter having a disc rotatable by the flow of energy at a speed proportionate to said flow and a registering dial actuated by the rotation of said disc, an adjustable speed changing device adapted and arranged whereby for a given movement of said disc varying registrations may be obtained on said dial by the adjustment of said device.

3. In a watthour meter having a primary disc rotatable by the flow of energy at a speed proportionate to said flow and a registering dial actuated by the rotation of said disc, a manually adjustable speed changing device comprising a second disc operably connected with said primary disc so as to rotate at the speed thereof and a third disc operably connected with said second disc and said registering dial, means for varying the point of operating connection between said second disc and said third disc so that the speed of said third disc may be varied with respect to that of said second disc, whereby for a given movement of said primary disc varying registrations may be obtained on said dial.

4. A meter having a movable element actuated by the flow of the quantity metered, a registering mechanism arranged to indicate the movement of said element, an adjustable speed changing device interposed between said element and said mechanism whereby for a given movement of said element varying registrations may be obtained on said mechanism and a scale and indicating means associated therewith adapted and arranged to show the adjustment of said speed changing device.

5. A watthour meter having a primary disc rotatable by the flow of energy at a speed proportionate to said flow, a registering dial actuated by the rotation of said disc, a manually adjustable speed changing device comprising a second disc operably connected to said primary disc so as to rotate at the speed thereof and a third disc normal to said second disc and operably connected thereto and to said registering dial, manually operable means for varying the point of operating connection between said second disc and said third disc so that the speed of said third disc may be varied with respect to that of said second disc whereby for a given movement of said primary disc varying registrations may be obtained on said dial, and a scale and indicating means associated therewith adapted and arranged to show the speed of said third disc and the registration on its connected dial relative to the speed of said primary disc.

WILLIAM K. HOLLAND.